United States Patent [19]
Corliss

[11] Patent Number: 6,065,968
[45] Date of Patent: May 23, 2000

[54] TOY FOR FORMING VARIABLE THREE-DIMENSIONAL DESIGN

[76] Inventor: Kathrine Kawamura Corliss, 15 Balbrook Dr., Mendham, N.J. 07945

[21] Appl. No.: 09/128,037

[22] Filed: Aug. 3, 1998

[51] Int. Cl.[7] .......................... G09B 11/00; G09B 23/04; A63H 33/04
[52] U.S. Cl. ................... 434/83; 273/157 R; 428/542.6; 434/211; 434/216; 446/18
[58] Field of Search .................................. 428/13, 542.6, 428/542.2; 160/371; 434/83, 211, 216; 446/85, 118; 273/157 R

[56] References Cited

U.S. PATENT DOCUMENTS

| | | |
|---|---|---|
| 501,675 | 7/1893 | Collins . |
| 2,312,157 | 2/1943 | Korotzer ................................. 434/216 |
| 2,728,149 | 12/1955 | Radt . |
| 2,757,459 | 8/1956 | Walker . |
| 2,836,912 | 6/1958 | Ranucci ................................... 40/470 |
| 3,038,272 | 6/1962 | Colston . |
| 3,589,034 | 6/1971 | Beecham . |
| 3,690,998 | 9/1972 | Brynjegard . |
| 3,752,730 | 8/1973 | Koff . |
| 3,905,133 | 9/1975 | Charman . |
| 4,006,540 | 2/1977 | Lemelson . |
| 5,328,374 | 7/1994 | Stevens ................................... 434/211 |
| 5,639,090 | 6/1997 | Stevens ................................... 273/287 |

FOREIGN PATENT DOCUMENTS

| | | | |
|---|---|---|---|
| 1748169 A1 | 7/1992 | U.S.S.R. ................................. 434/216 |

*Primary Examiner*—Kien T. Nguyen
*Assistant Examiner*—Kurt Fernstrom
*Attorney, Agent, or Firm*—Mathews, Collins, Shepherd & Gould, P.A.

[57] ABSTRACT

A toy that may be used to make three-dimensional designs from elastic members comprises a base and at least one, and preferably two, vertical sidewalls rotatable relative to the base. The base and the at least one sidewall each have a face surface with a plurality of retaining means disposed thereon. A plurality of elastic members may be secured to the plurality of retaining means and thereby suspended between the base and the at least one sidewall to form a three-dimensional design, for example, each member may be attached at a first point along the member to a retaining means on the at least one sidewall and at a second point along the member to a retaining means on the base. The at least one sidewall or the base can be rotated to vary the length of the elastic members, thereby changing the three-dimensional design formed thereby.

14 Claims, 4 Drawing Sheets

TOY FOR FORMING VARIABLE THREE-DIMENSIONAL DESIGN

FIELD OF THE INVENTION

The present invention relates to a toy that may be used to make three-dimensional variable designs from elastic members and more particularly, to a toy that has at least two face surfaces rotatable relative to each other and between which elastic members may be suspended, so that the elastic members may form geometric designs that can be varied by rotating one or more of the face surfaces of the toy.

BACKGROUND OF THE INVENTION

It is important for children to have playthings which are fun for them to use and also educational. Since a child may spend much time playing during his or her developmental years, a significant consideration in making toys is that they aid in developing the child's intellect and creativity. Creative leisure activities are indeed beneficial for people of all ages. It is also helpful for toys to be sturdy and relatively simple and inexpensive to make, thus minimizing their cost.

People apparently have had a long-time interest in toys involving use of string to make three-dimensional geometric patterns. For example, U.S. Pat. No. 501,675, issued to Collins on Jul. 18, 1893, describing an educational toy to be used for making designs with string. The device of the Collins patent has two facing, horizontally-disposed walls joined by a central pole piece wherein the walls have pins on their edges so that designs may be created by wrapping string around the pins on the edges of the walls. Other toys for making geometric designs with string, thread, or other string-like material are described in the following U.S. patents, which are incorporated herein by reference: U.S. Pat. No. 4,006,540, issued to Lemelson on Feb. 8, 1977; U.S. Pat. No. 3,905,133, issued to Charman on Sep. 6, 1975; U.S. Pat. No. 3,752,730, issued to Koff on Aug. 14, 1973; U.S. Pat. No. 3,690,998, issued to Brynjegard on Sep. 12, 1972; U.S. Pat. No. 3,589,034 issued to Beecham on Jun. 29, 1971; U.S. Pat. No. 3,038,272, issued to Colston on Jun. 12, 1962; U.S. Pat. No. 2,757,459, issued to Walker on Jun. 22, 1954; and U.S. Pat. No. 2,728,149, issued to Radt on Dec. 27, 1955. The Walker patent, U.S. Pat. No. 2,757,459, shows three panels secured together to form a three-dimensional corner, wherein each one of the walls has apertures through it so that string may be weaved through the device to form three-dimensional designs between the panels.

While each of the toys described in the foregoing patents are advantageous in that they may be used to form designs, and in some cases three-dimensional designs, with string, there are limits to their use. For example, in each case the parts of the device are fixed, and the designs once formed may only be varied by removing the string or thread from the device and re-threading it to create a new design. In the Beecham patent, U.S. Pat. No. 3,589,034, pegs inserted in the device may be removed and placed in new locations in order to provide a frame for making new designs.

As may be appreciated, those concerned with the development and welfare of children are continuously in search of new toy designs. Also, it would be advantageous to enhance the educational and entertainment value of string-type weaving toys to provide a toy with which designs may not only be formed between the parts but also varied, without having to remove either the string or parts of the toy to create the new designs. The instant invention provides such a device. Further advantages may appear more fully upon consideration of the description given below.

SUMMARY OF THE INVENTION

Summarily described, the invention relates to a toy comprising a base and at least one sidewall, wherein the sidewall is orientated substantially perpendicular to the base, and both the base and the sidewall each have a face surface with a plurality of retaining means disposed thereon. The at least one sidewall and the base are rotatable relative to each other. A plurality of elastic members may be secured to the plurality of retaining means, e.g., each one of the plurality of elastic members may be secured at a first point along the member to a retaining means on the at least one sidewall and at a second point along the member to a retaining means on the base so that a three-dimensional design is formed thereby. The at least one sidewall or the base can be rotated to vary the length of the elastic members and thereby change the three-dimensional design formed thereby. In a preferred embodiment, two rotatable sidewalls are vertically oriented in relation to a substantially horizontal, fixed base, wherein the sidewalls face each other in a substantially parallel configuration. With this embodiment, the elastic members may be disposed between the base and either one of the sidewalls, or between the sidewalls, to form a wide-variety of three-dimensional designs, and these designs may be altered by rotating one or both of the sidewalls.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention, are not limiting in nature, and are not to scale.

Detailed Description of the Invention

Figure 1:
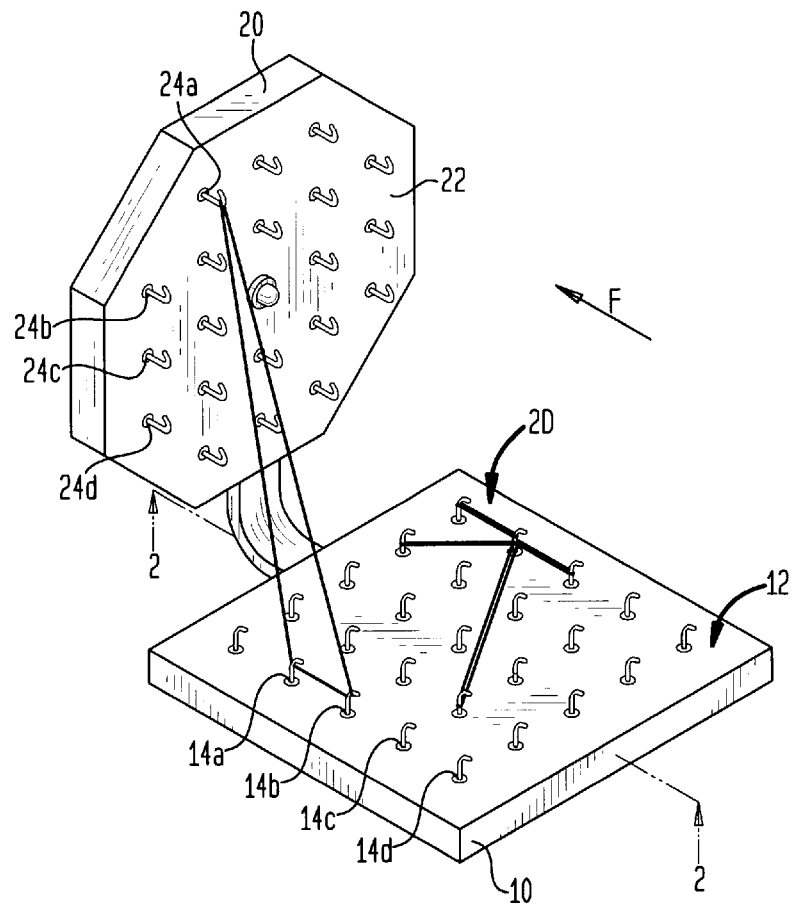
FIG. 1 shows a perspective view of one embodiment of the inventive toy.
Figure 2:
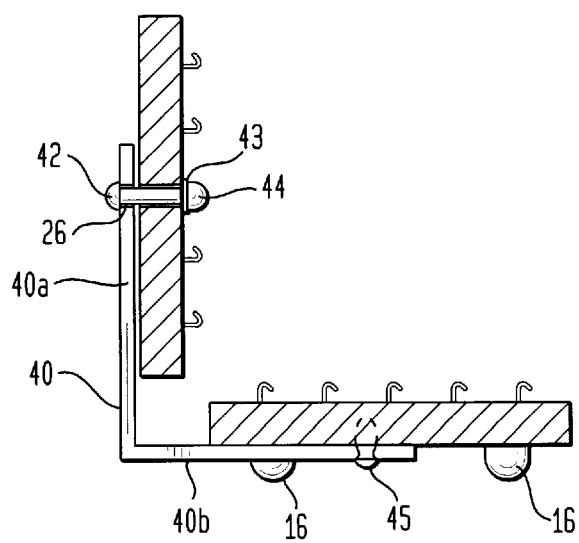
FIG. 2 shows a side view of the embodiment of FIG. 1 taken along the line 2—2 of FIG. 1.

Referring to FIGS. 1 and 2, there are shown a perspective view and cross-sectional side view, respectively, of one embodiment of the inventive toy. As can be seen from these figures, the toy comprises a base 10 which has a top face surface 12 and a plurality of retaining means 14a, 14b, 14c, 14d, etc., disposed on the face 12. Preferably, the retaining means are hooks as shown; however, they may comprise any other means capable of retaining resilient, elastic members between the parts of the toy. For example, for the retaining means clasps may be used, or finger-like flaps oriented parallel with the face of the base 12 and disposed above or within it, e.g., within depressions in it.

At least one sidewall 20 projects upward from the base 10 and is oriented substantially perpendicular to the base 10. It has a side face surface 22 with a plurality of retaining means 24a, 24b, 24c, 24d, etc. thereon. The top face surface 22 and the side face surface 12 are in open communication, that is, there are no barriers between them so that elastic members, e.g., rubber bands, may be suspended between them. For example, in FIG. 1, one rubber band is shown attached to the base at certain points along the rubber band at retaining means 14a, 14b, and to the sidewall at retaining means 24a. When a plurality of elastic members (e.g., rubber bands) are attached to the sidewall and the base, a three-dimensional geometric design may be formed. The at least one sidewall and the base are rotatable relative to each other so that, once the elastic members are suspended between the parts, the parts can be rotated to vary the length of the elastic members suspended therebetween to change the design formed by the members. Preferably, the base comprises a fixed square platform as shown in FIG. 1, and the sidewall is rotatable and is substantially circular, including hexagonal or octagonal.

FIG. 2, showing a side view taken along the line 2—2 of FIG. 1, illustrates one approach for attaching the sidewall to the platform and making it rotatable. In particular, an L-shaped bracket 40 is provided to attach the parts. The vertically-extending arm 40a of the bracket is pivotally coupled to the sidewall by extending a bolt 42 through a bore 26 in the bracket and the sidewall (preferably at its center point), and by securing the sidewall on the bolt with a washer 43 and nut 44. Naturally, the bore 26 should be wider in diameter than the bolt 42, so that the sidewall will spin about the bolt 42. The horizontally-extending arm of the bracket 40b is coupled to the underside of the platform opposite the top face surface 12, such as, for example, with use of one or more permanently-fixed screws 45. Legs 16 can be attached to the underside of the platform to raise it above the playing surface (e.g., a table or desk surface), and enable the platform to rest securely on this surface without interference from the bracket 40.

Figure 3A:
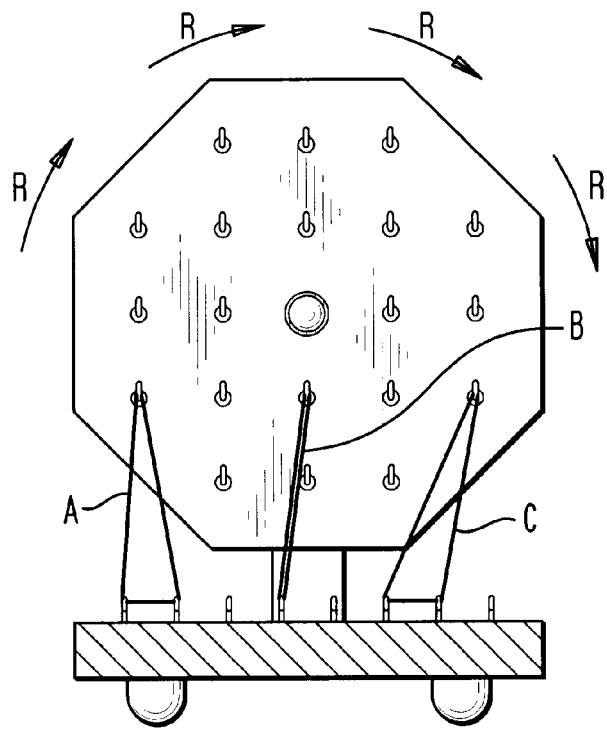
FIG. 3A shows a frontal view of the embodiment of FIG. 1, looking in the direction of arrow "F" of FIG. 1, with rubber bands attached in a first configuration.
Figure 3B:
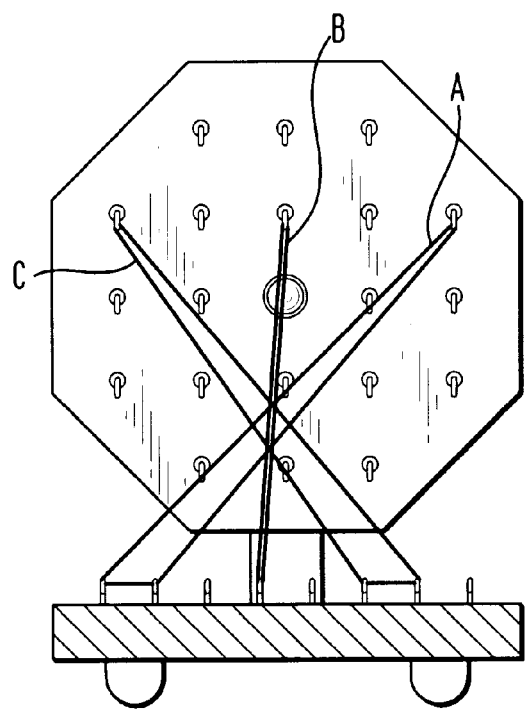
FIG. 3B shows the same view as FIG. 3A, with the rubber bands in the first configuration, but with the sidewall rotated so that a new design has been formed.

To illustrate how designs can be varied by rotating the toy parts, without having to remove or replace any of the parts or attached members, reference is made to FIGS. 3A and 3B. FIG. 3A shows a frontal view of the embodiment of FIG. 1, looking in the direction of arrow "F" of FIG. 1, with three rubber bands A, B, C, attached in a first configuration. FIG. 3B shows the same view as FIG. 3A, with the rubber bands attached to the toy parts at the same locations, e.g., in the same, first configuration. However, the sidewall 20 has been rotated, following arrows "R" of FIG. 3A, so that a new design, which is somewhat of a star or criss-cross design, has been formed. Advantageously, the toy is provided to the user with a plurality of differently-colored and differently-sized rubber bands which further enhance the entertainment value of the toy. The rubbers band should be sufficiently long and resilient so that they can be stretched between the parts as they are rotated. Also, it should of course be understood that the rubber bands can be placed on more than one retaining means on each part (i.e., base or sidewall), and in addition to the three-dimensional designs formed by suspending the rubber bands between the parts, two-dimensional designs may be formed on the base or on the sidewall, e.g., arrow "2D" of FIG. 1.

Figure 4:
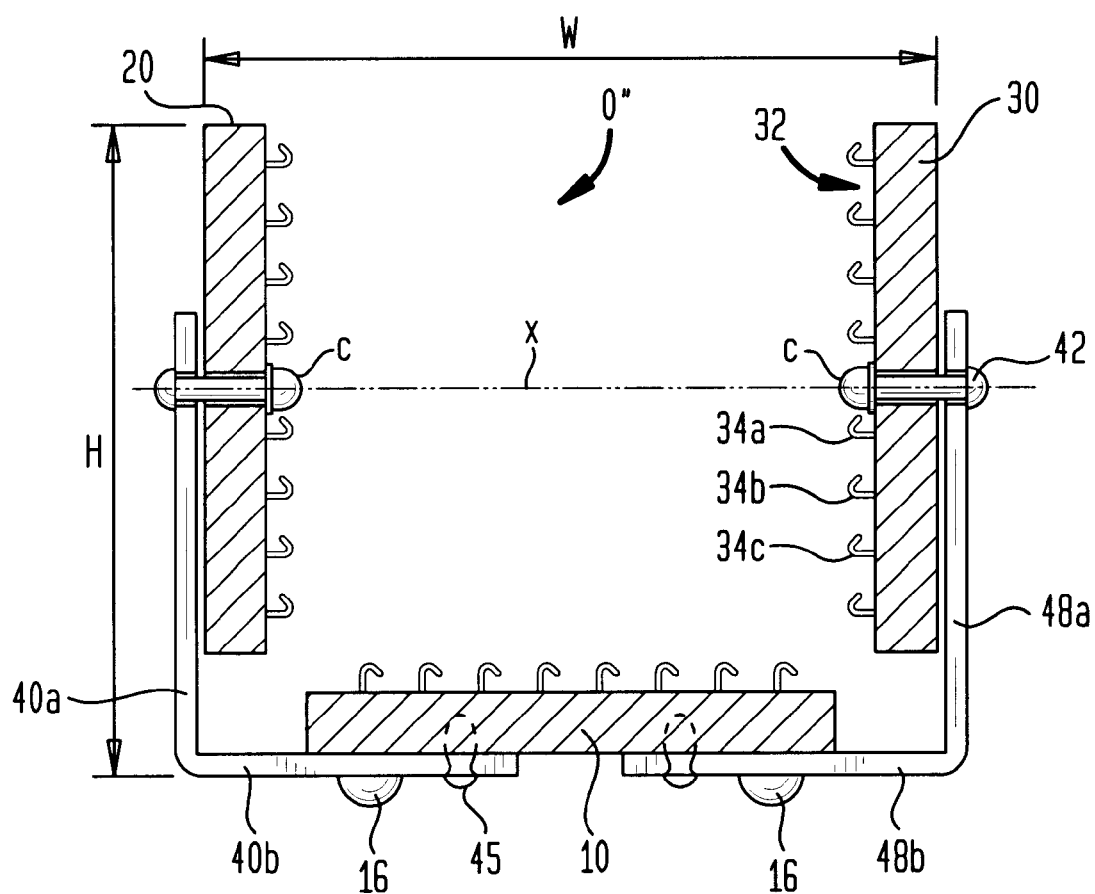
FIG. 4 shows a side view of an alternative embodiment of the inventive toy analogous to the view of FIG. 2.

FIG. 4 shows a side view of an alternative embodiment of the inventive toy, analogous to the view of FIG. 2. As can be seen, in this embodiment there is a second vertically-extending sidewall 30, also having a face surface 32 with a plurality of retaining means 34a, 34b, 34c, etc., disposed thereon. A second bracket 48 is shown for attaching the second sidewall 30 to the base 10, with the vertical arm 48a attached to the sidewall, and the horizontal arm 48b, attached to the base 10. However, it should be understood that other types of brackets (such as a single U-shaped bracket) may be used, and other tools for attaching the parts may be used, with the L-shaped bracket reflecting an illustrative, preferred approach.

With this embodiment (FIG. 4), there are three parts (the base and two sidewalls) each having retaining means; thus, the rubber bands can be attached between the two sidewalls 20, 30, or between the top face surface of the base 10 and either of the two sidewalls. In this way, the number of designs that may be formed with the toy is increased, and also, more complex designs may be formed. In a preferred embodiment, as shown, the two vertical sidewalls are disposed substantially parallel with each other, so that the center point of each of the two sidewalls, i.e., point "C" are aligned along a common axis, e.g., denoted in FIG. 4 by dashed line X. Naturally, the two walls 20, 30, could be placed side-by-side so that they are aligned in a substantially perpendicular, instead of a substantially parallel configuration, but placing them in a parallel configuration as shown increases the depth perception given to the designs that are created, in that the background for the design comprises an open space (e.g.,. "O" of FIG. 4). The toy may be made in various sizes and shapes. However, a preferred embodiment comprises a substantially square base 10 having a width "W" of about ten inches (and thus the same depth), and octagonal sidewalls of essentially the same dimension so that the total height of the device "H" of FIG. 4 is about twelve inches.

Figure 5A:
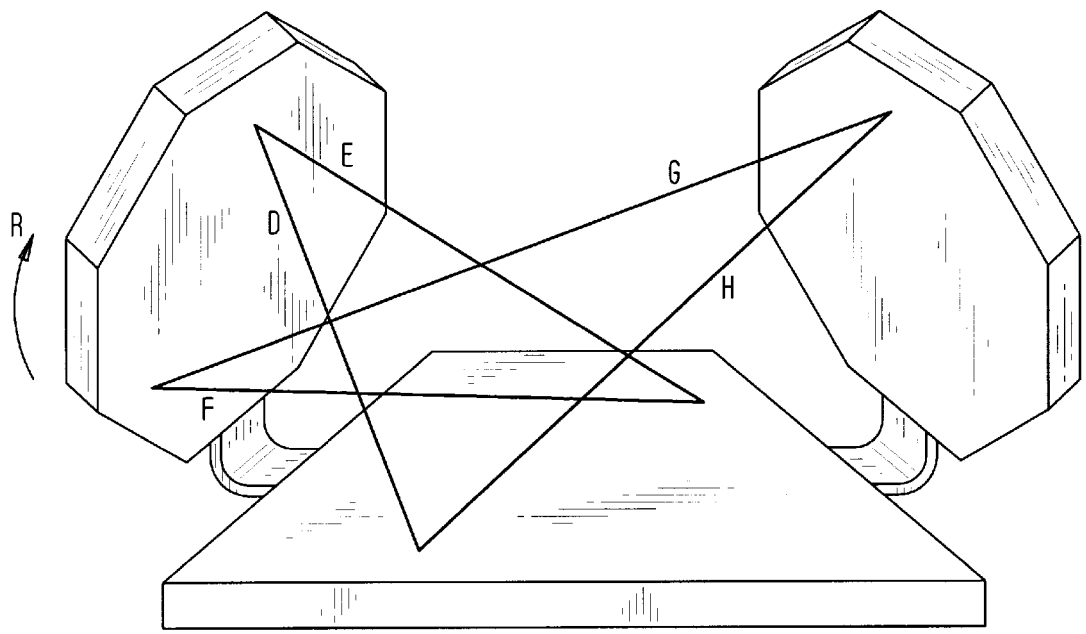
FIG. 5A shows a side perspective view of the embodiment of FIG. 4, with rubber bands attached in a second configuration.
Figure 5B:
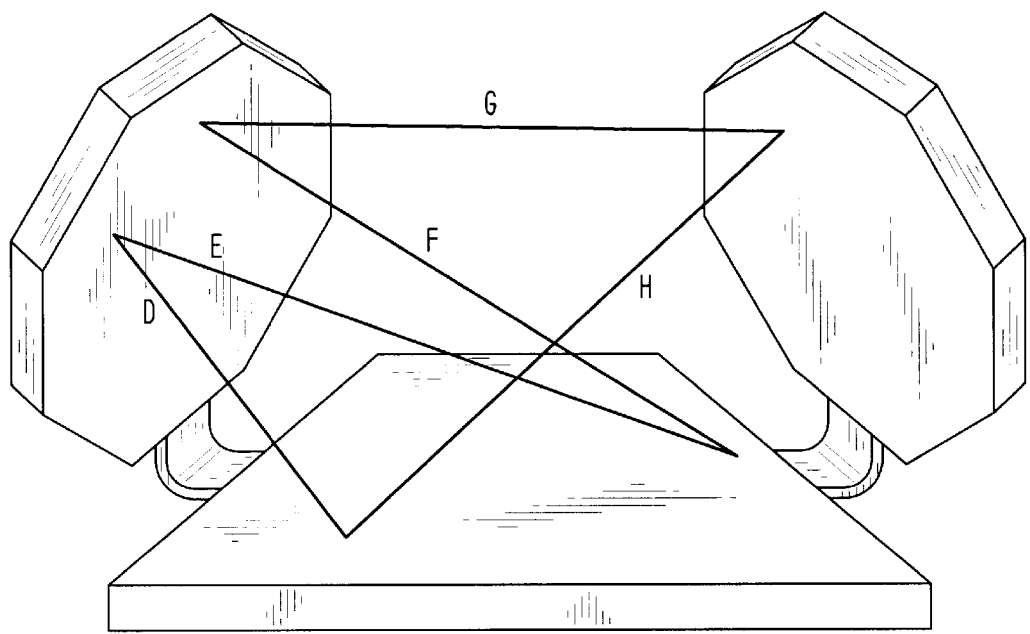
FIG. 5B shows the same view as FIG. 5A, with rubber bands attached in the second configuration, but with the sidewalls rotated so that a new design is formed.

To illustrate how designs can be varied by rotating the toy parts, without having to remove or replace any of the parts or attached members, reference is made to FIGS. 5A and 5B. FIG. 5A shows a side perspective view of the embodiment of FIG. 4, with five rubber bands, D, E, F, G, and H, attached in a second configuration, and FIG. 5B shows the same view as FIG. 5A, with the same five rubber bands D, E, F, G, H, attached to the sidewalls with the same retaining means. As between FIGS. 5A and 5B, the rubber bands have not been moved, and none of the toy parts have been removed; however, the sidewall 20 has been rotated, e.g., following arrow "R" of FIG. 5A, so that a new design has been formed.

It is understood that the embodiments described herein are merely exemplary and that a person skilled in the art may make variations and modifications without departing from the spirit and scope of the invention. All such variations and modifications are intended to be included within the scope of the appended claims.

I claim:

1. A toy for making three-dimensional, variable designs from a plurality of elastic members, the toy comprising:

a base having a top face surface with a plurality of retaining means disposed thereon; and at least one sidewall oriented substantially perpendicular to the base and having a side face surface with a plurality of retaining means disposed thereon;

wherein the top face surface and the side face surface are in open communication so that the plurality of elastic members may be suspended between the base and the sidewall to form a design by attaching the members to the plurality of retaining means on the base and the at least one sidewall, and wherein the at least one sidewall and the base are rotatable relative to each other so that either the at least one sidewall or the base can be rotated to vary the length of the elastic members suspended therebetween to thereby change the design formed by the members.

2. The toy of claim 1, in which the plurality of retaining means on the top face surface of the base and the side face surface of the at least one sidewall comprise a plurality of hooks.

3. The toy of claim 1, in which the base comprises a substantially horizontal fixed platform having an underside opposite the top face surface, and the at least one sidewall is rotatable relative to the base.

4. The toy of claim 3, in which the platform is substantially square and the at least one sidewall is substantially circular including hexagonal or octagonal.

5. The toy of claim 3, further comprising an L-shaped bracket, wherein the vertically-extending arm of the bracket is pivotally coupled to the at least one sidewall opposite the side face surface, and the horizontally-extending arm of the bracket is coupled to the underside of the platform opposite the top face surface.

6. A toy for making variable designs comprising the combination of (a) the toy of claim 1 and (b) a plurality of rubber bands.

7. A toy for making variable designs comprising the combination of (a) the toy of claim 5 and (b) a plurality of differently-colored and differently-sized rubber bands.

8. A toy for making three-dimensional, variable designs from a plurality of elastic members, the toy comprising:

a horizontally-oriented base having a top face surface with a plurality of retaining means disposed thereon; and two vertical sidewalls orientated substantially perpendicular to the base, each sidewall having a side face surface with a plurality of retaining means disposed thereon;

wherein the top face surface and the side face surfaces are in open communication so that each one of the plurality of elastic members may be attached at one point along the member to a retaining means on either the top face surface or at least one of the two side face surfaces and at another point along the member to a retaining means on either the top face surface or at least one of the two side face surfaces, whereby the plurality of elastic members may be suspended between the face surfaces of the base and the sidewalls to form a three-dimensional design, and wherein the two sidewalls and the base are rotatable relative to each other so that at least one of the sidewalls or the base can be rotated to vary the length of the elastic members suspended therebetween to thereby change the design formed by the members.

9. The toy of claim 8, in which the plurality of retaining means on the top face surface of the base and the side face surfaces of the two sidewalls comprise a plurality of hooks.

10. The toy of claim 8, in which the two vertical sidewalls are disposed substantially parallel with the center point of each of the two sidewalls being axially aligned.

11. The toy of claim 10, in which the base comprises a substantially horizontal fixed platform having an underside opposite the top face surface, and the two sidewalls are rotatable relative to the base.

12. The toy of claim 11, in which the platform is substantially square and the two sidewalls are both substantially circular including hexagonal or octagonal.

13. The toy of claim 12, further comprising a pair of L-shaped brackets, wherein the vertically-extending arm of each one of the pair of brackets is pivotally coupled to one of the two sidewalls opposite the side face surface and the horizontally-extending arm of each one of the pair of brackets is coupled to the underside of the platform opposite the top face surface.

14. A toy for making variable designs comprising the combination of:

(a) a plurality of rubber bands; and (b) a device comprising:

(i) a fixed, horizontally-oriented platform having a top face surface with a plurality of retaining means disposed thereon; and (ii) two vertical sidewalls orientated substantially perpendicular to the platform and parallel to each other, each sidewall being rotatable relative to the platform and having a side face surface with a plurality of retaining means disposed thereon;

wherein the top face surface and the side face surfaces are in open communication so that each one of the plurality of elastic members may be attached at one point along the member to a retaining means on either the top face surface or at least one of the two side face surfaces and at another point along the member to a retaining means on either the top face surface or at least one of the two side face surfaces, whereby the plurality of elastic members may be suspended between the face surfaces of the base and the sidewalls to form a three-dimensional design, and wherein the two sidewalls can be rotated to vary the length of the elastic members suspended on the device to change the design formed thereby.

\* \* \* \* \*